United States Patent Office 3,343,995
Patented Sept. 26, 1967

3,343,995
MAGNESIUM BASE ELECTRODE COATED WITH CONDUCTIVE CARBON-CONTAINING EPOXY RESIN
Raymond W. Reid, Sanford, and Percy F. George, Midland, Mich., assignors to The Dow Chemical Company, Midland, Mich., a corporation of Delaware
No Drawing. Filed June 1, 1966, Ser. No. 554,349
3 Claims. (Cl. 136—121)

ABSTRACT OF THE DISCLOSURE

The invention is an electrically conductive coated magnesium metal electrode wherein the coating comprises a carbon filled epoxy resin.

This application is a continuation-in-part of application Ser. No. 426,437, filed Jan. 18, 1965, which application in turn was a continuation of application Ser. No. 125,653, filed July 21, 1961, both now abandoned.

This invention is concerned with conductive coatings for metal surfaces and more particularly relates to a metal electrode having an electrically conductive, liquid impervious coating and to a method of preparing such electrodes.

The use of conductive coatings on metal electrodes, e.g., magnesium based anodes, finds high utility, for example, when such electrodes are used in stacked cell batteries such as the wet type, e.g., $Mg-MnO_2$, or the reserve dry cells, i.e., $Ag-AgCl$, $Cu-CuCl_2$, etc. In such batteries, the anode of one cell is in juxtaposition with the cathode contact of the next adjacent cell and makes electrical contact therewith. Such battery structures are compact, efficient and economical to make.

The need for providing electrically conductive coatings on the anodes rises from the fact that the success of the cell stacking arrangement depends on proper chemical isolation of the anode of each cell from the electrolyte of the next adjacent cell. If the anode of one cell is exposed to the electrolyte from another cell, the current will pass through the electrolyte thereby short circuiting the cell.

Heretofore, attempts to coat a magnesium based electrode, such as the flat, plate-like anode used in the stacked cell batteries have been made by painting the exposed side of the metal with a conductive paint. This has not proved satisfactory since the application time is too long for economical, commercial production and the resulting coating is not impervious as the paint dries.

Another approach for providing this coating has been to apply a conductive cement and a liquid-tight conductive cloth to the exposed magnesium surface. This arrangement, when the coated electrodes were used as anodes in a stacked cell battery, resulted in a high resistance between the coating and the magnesium.

A further attempt to apply conductive coatings to the magnesium metal surfaces was the application of tar and graphite with successive applications of heat and graphite as set forth in U.S. Patent No. 2,745,774. With this procedure a substantially liquid impervious, conductive coating is obtained but the application time is long and the consistency of electrical conductance varied. Further, this coating does not withstand moderately elevated temperatures as the tar melts.

U.S. Patent 2,834,826 teaches a method for applying an electrically conductive fluid impervious wax coating to metallic electrodes and especially those made of magnesium. In this process a magnesium electrode, for example, is cleaned to remove surface oxide and hydroxide coatings. The clean surface of the metal then is abraded with graphite or carbon and a coating of a molten mixture of a wax (having a melting point at a maximum of about 175° C.) and finely divided carbon particles then applied to the electrode surface. Carbon particles are sprinkled onto the wax coated magnesium and the coated magnesium heated at least to the melting point of the wax to absorb the carbon into the coating. An additional step involving a second sprinkling of graphite particles plus a second heating of the wax to dispense the particles through the coating is indicated in the patent to be useful.

U.S. Patent 2,692,321 teaches a resistor having a high electrical resistance shown to be from 2500 ohms to 500,000 ohms. The alleged high resistance, low conductivity device of Hicks is formed by first placing an electrically conductive material, for example copper or silver on an electrically insulating backing member in pairs of opposed spaced apart deposits. Deposits of a resistance material which is a composition of powdered carbon (27–33 volume percent), sodium silicate (50 volume percent) and a resin (17–25 volume percent) are placed on a second backing member. These latter deposits are of a size and are so disposed on the second backing member such that when the surface of this second member bearing the high resistance material is placed over and against the face of the member containing the electrically conductive deposits, the resistance deposits will register with and bridge the spaces between the pairs of deposited electrically conductive metal. The resistance material so employed is such that when the assemblies have been placed in face to face contact by curing at a temperature of about 350° F. for a period of from 30 minutes to an hour the resistance material softens and flows into intimate contact with the spaced electrical conductive deposits which it bridges. When it rehardens following the curing step it adheres firmly to the metal deposits thus providing a good contact and union between the spaced conductive deposits and the bridging resistance material. In actual preparation, multiple or single resistance units are formed in a given sample and the specifically shaped resistors after curing then are pierced and blanked out from the assembly.

Now unexpectedly a highly electrically conductive coating has been found for metal electrodes which does not suffer from the drawbacks and problems of these coatings mentioned hereinbefore.

It is a principal object of the present invention, therefore, to provide an improved electrically conductive coating for metal electrodes.

It is a further object of the present invention to provide a highly electrically conductive coating which is substantially impervious to liquids and is highly abrasion resistant.

It is an additional object of the present invention to provide an electrically conductive coating for magnesium electrodes which is capable of retaining a desirably low electrical resistance during prolonged storage or use of such coated electrodes.

It is also an object of the present invention to provide an electrically conductive coating for magnesium surfaces that maintains an unexpected high level of electrical conductivity under adverse and prolonged conditions of operation.

It is a further object of the present invention to provide a tightly adherent conductive coating for metal electrodes that can withstand bending and shearing of the metal without losing its adherence.

It is another object of the present invention to provide an improved, economical method of applying a highly electrically conductive coating to the surface of a metal electrode.

These and other objects and advantages will be recognized from the detailed description presented hereinafter.

The new and novel highly electrically conductive coatings of the present invention for use in preparing the electrically conductive coated metal electrode comprises a carbon filled epoxy resin. In particular, the final dried coating composition is comprised of from about 50 to about 70 weight percent of particulate carbon and from about 50 to about 30 weight percent of the epoxy resin. Preferably this coating composition contains about 60 weight percent carbon and about 40 weight percent of the epoxy resin.

The epoxy resins to be employed in the instant novel coating composition are limited to those epoxy resins which do not liberate water or other vapor in setting and which in the cured state are solid, electrically resistant, i.e., non-electrically conducting chemically inert, have low shrinkage, are substantially free from chlorides and sulfates and are substantially unreactive, i.e., do not undergo detrimental reaction with the metal electrode to produce corrosion of the metal. Preferably, epoxy resins which are self curing with heat, i.e., by baking at about 300° F. or above (the so-called one-package resin) or, those employing aliphatic amines as a curing agent (two-package systems) which can be cured at relatively low temperatures, i.e., from about room temperature to about 120–140° F., for example, are employed for the instant coatings. One example of the latter type of resin particularly suitable for use in the instant invention is the epoxy resin product of the sodium salt of bisphenol A with epichlorohydrin utilizing an aliphatic amine catalyst as convertor.

The electrical resistance of coatings of the present invention are very low. To illustrate; electrodes of a magnesium base alloy coated with the novel composition of the present invention exhibited a resistance of from about 0.03 to about 0.2 ohm per square inch.

In order to achieve the desired non-permeability of the coating and the unexpected low resistance it is requisite that the coating composition be maintained within the disclosed range.

With compositions employing carbon in excess of the limits set forth, porous coatings may result. Also, with the higher carbon concentrations, the mix becomes viscous and is difficult to apply to the metal surface in a desirably smooth uniform coating. Decreasing the carbon below about 50 weight percent gives an undesirable increase in coating resistance.

Although a single layer of the coating deposited on the metal surface gives satisfactory electrical conductivity, preferably a number of thin layers will be built up on the metal electrode. Such a laminated coating assures formation of a non-permeable coating.

The thickness of the conductive coating can vary depending on the particle size of the carbon used as well as the final coating thickness desired. In any event the coating should be of such thickness so as to be impervious to moisture. Additionally the coating should be free from oil and curable at moderate temperatures, e.g. from about 300 to about 500° F. for the one package system and at lower temperatures for the amine catalyst resin as set forth hereinbefore. Ordinarily a total coating thickness of from about .001 to about .008 inch or more will be employed and preferably the coating will range from about 0.0015 to about 0.003 inch in thickness.

If desired the surface of the final coating can be ground or abraded lightly to further increase its conductivity. Advantageously, for electrodes having a multi-layered conductive coating, the surface of each layer can be so treated prior to the application of the succeeding layer.

The carbon used in admixture with the epoxy resin can be selected from any of a variety of finely divided, particulate carbons including for example, battery grade graphite, petroleum coke, acetylene black and the like.

Preferably petroleum coke which has been calcined and ground to pass a 325 mesh screen (U.S. Standard Sieve Series) is preferred as the conductive medium. If the coating is reasonably thick, e.g. at least .006–.007 inch, coke passing a 100 mesh screen is suitable.

Extremely finely divided carbons, such as colloidal graphite are not preferred for use in the coatings as these give undesired low conductivities.

The term epoxy resin as used herein refers to those cross-linked, cured, inert, solid polyether resins produced from the polymerization of a molecule having terminal reactive epoxy groups. In its simplest form, the epoxy molecule can be exemplified by the diglycidyl ether of bisphenol A which is prepared by reacting epichlorohydrin and bisphenol A. In this molecule the bisphenol A can be substituted by ethylene glycol, glycerol, and related hydroxyl containing compounds. Likewise, dichlorohydrin and butadiene dioxide, for example can be used as the epoxy containing starting materials replacing epichlorohydrin.

These epoxy molecules cure into the desired thermoset cross-linked resins by direct linkage between epoxy groups, linkage of epoxy groups with aromatic or aliphatic hydroxyls as may be present in the molecule and by crosslinkage with a curing agent, such as an aliphatic amine, through various radicals.

With the catalyst converted type resins, it is required that the resin does not start to set for a period of time, i.e., at least about 1 hour after application, in order ot allow time for the carbon to be thoroughly wetted. Alternatively, the resin and carbon can first be mixed and allowed to stand until the carbon is wetted and the catalyst added just prior to applying the coating to the magnesium panel.

Specific epoxy resins which are suitable for use in the present conductive coatings include for example a one package bake cure No. 2 DDL epoxy resin (Egyptian Lacquer Co.) which is thermoset by heating to above about 325° F. and No. DER 661 amine catalyzed epoxy resin, a trademarked product of The Dow Chemical Company.

In preparing the electron conductive coated electrodes in accordance with the method of the present invention, the surface of the metal to be coated is cleaned so as to be free from oil, dirt, surface coatings, etc. With magnesium or magnesium based alloys, for example, the cleaning can be carried out by conventional chemical baths used for magnesium based materials as set forth in "Chemical Finishing of Magnesium," The Dow Chemical Company, Midland, Mich., 1955. Alternatively, the panel can be abraded by a wire brush, Aloxite cloth or the like or a combination of mechanical and chemical treatments can be used.

The graphite-epoxy resin mixture is then applied to the panel surface to give a coating or layer of desired thickness. The mixture can be applied by dipping the panel in the mix, by a doctor blade technique, by brushing or spraying the fluid mass onto the panel surface, roller coating, etc. If desired the resin mixture can be thinned with a suitable compatible organic thinner as is known in the art. The co-coated panel surface is subjected to a curing cycle normally used for the epoxy resin employed.

For those panels wherein a multi-layered coating is desired each layer is cured prior to the application of the succeeding layer to the built up coating.

The coating applied in accordance with the method of this invention adheres tightly to the metal electrode, withstands bending and shearing without losing its adherence and has low resistivity. Although coated electrodes of magnesium and magnesium based alloys, i.e. those containing at least 70 percent by weight magnesium find particular utility, the method of the invention likewise finds use in preparing new and novel electrically conductive coated electrodes of copper, steel and other metals for which a tightly adherent, electrically conductive, liquid impervious film may be desired.

Although the coated electrodes of the instant invention produced by the present method exhibit conductances which are very high, if desired a conductive metal layer, e.g., silver, can be rolled or otherwise applied to the surface of the epoxy resin-graphite coating thereby increasing the conductivity still further. A very satisfactory method of applying a thin silver layer is as follows. A mixture of epoxy resin containing from about 20 to about 40 weight percent silver dust is roller coated or sprayed over the epoxy-carbon coating in a layer or less than 0.001 inch thick and the epoxy resin-silver coating then baked at about 325° F. Alternatively, the cured epoxy resin-carbon coating can be activated by dipping the electrode for about one minute in an aqueous stannous chloride solution containing about 0.2 percent by weight of the stannous chloride followed by rinsing the electrode in cold water. The electrode is then treated simultaneously, as by spraying, with an aqueous solution of formaldehyde (65 cubic centimeters of 40 percent formaldehyde dissolved in one liter of water) and an aqueous solution of a freshly prepared silver nitrate solution (60 grams $AgNO_3$ per liter of water). The silver nitrate solution is prepared by dissolving the salt in the water, adding ammonium hydroxide to the resulting solution until it turns dark brown and again clears to a transparent colorless solution followed by adding fresh 60 g./liter $AgNO_3$ solution to the ammonium hydroxide treated solution until a faint brown cast is produced. By spraying the solutions at a pressure of from about 35 to about 40 pounds per square inch, an even silver coating having a thickness of less than .001 inch is produced.

The conductivities of the silver coated epoxy-carbon electrode coating produced by these methods gives a resistance of from about 0.010 to about .015 ohm per square inch.

The following examples will serve to further illustrate the present invention, but are not meant to limit it thereto.

*Example 1.*—Coupons of about 1.5 by 2 inch samples of 0.025 inch thick AZ31B magnesium alloy (nominal composition 3 percent aluminum, 1 percent zinc, 0.4 percent manganese, balance magnesium) were cleaned by immersion for about 30 seconds at room temperature (20–25° C.) in a chromic acid-sodium nitrate pickling bath (nominal composition $CrO_3$–24 oz., $NaNO_3$–4 oz., $MgF_2$–0.125 oz., water to make one gallon). The chemically cleaned samples were removed from the bath, rinsed with water and air dried.

One surface of the metal was coated with carbon-one package bake cure epoxy resin mix using a doctor blade technique to provide a substantially uniform film thereon. The conductive coating mixes of epoxy resin-carbon were prepared by slurrying either about 50 or about 60 weight percent particulate battery grade graphite (−325 mesh U.S. Standard Sieve Series) as based on the weight of the solids in the resin mix, into a bake cure thermosetting epoxy resin. After preparing the mix, it was allowed to stand for one hour with occasional hand stirring prior to its application to the magnesium surface. The coated panel electrode was baked at about 325° F. for about 20 minutes to set the coating into a substantially liquid impervious layer.

Electrical resistance readings of coated panels were measured by placing a round plastic ring enclosing one square inch of cross sectional area onto the coated surface, filling the ring with mercury and measuring the resistance of the coating. The resistance was measured by an ohmmeter, one lead of which contacted the base metal and the other lead of which contacted the mercury. Table I which follows lists the electrical resistances obtained for coatings in the applied condition and after subjecting the coated panels for about 264 hours to 100 percent humidity at 95 to 100° F.

TABLE I

| Run No. | Graphite in Dried Coating (percent by weight) | Coating Thickness (inch) | Resistance (Ohms) | |
|---|---|---|---|---|
| | | | Initial | 264 hrs. Humidity Exp. |
| 1 | 50 | 0.0025 | 0.179 | 0.189 |
| 2 | 50 | 0.0025 | 0.217 | 0.174 |
| 3 | 60 | 0.0035 | 0.117 | 0.123 |
| 4 | 60 | 0.0035 | 0.112 | 0.121 |

*Example 2.*—Using the same technique of panel coating, type of carbon, carbon and alloy panels as described for Example 1, a number of tests were run with a low temperature cure amine catalyzed epoxy resin. The results of these tests are presented in Table II.

TABLE II

| Run No. | Epoxy Resin Type | Graphite in Dried Coating (percent by wt.) | Coating Thickness (inch) | Resistance (Ohms) | |
|---|---|---|---|---|---|
| | | | | Initial | 168 hrs. Humidity Exp. |
| 1 | Resin product of sodium salt of bisphenol A with epichlorohydrin.[1] | 60 | 0.0025 | .107 | |
| 2 | ----do---- | 60 | 0.0025 | .126 | |
| 3 | ----do---- | 70 | 0.0035 | .136 | .250 |
| 4 | ----do---- | 70 | 0.0035 | .139 | .240 |

[1] Amine type catalyst converted.

*Example 3.*—A stacked cell battery, of the type described in U.S. Patent 2,745,744 was prepared utilizing a 50 percent one-package bake cure epoxy resin—50 percent calcined petroleum coke as conductive coating mix. The cathode mixture consisted of, by weight, 89 percent $MnO_2$, 3 percent $BaCrO_4$ and 8 percent acetylene black wetted with 320 cubic centimeters and 250 grams/liter $MgBr_2$+0.2 gram/liters $Na_2CrO_4$ electrolyte per 1000 grams of dry depolarizer mix.

The assembled cell was successfully tested. None of the electrolyte was observed to have penetrated the epoxy resin-carbon coating on the magnesium based metal anodes and the coating resistance remained low over prolonged storage and during the operating life of the battery.

*Example 4.*—Coupons of about 1.5 to 2.0 inch samples of about 0.011 inch thick AZ61A alloy (nominal composition 6.5 percent Al, 0.2 percent Mn, 1 percent Zn, balance Mg) were cleaned as described in Example 1. A coating mix was prepared using DER 661 amine cured epoxy resin—calcined petroleum coke (−325 mesh U.S. Standard Sieve Series) and this applied to one surface of a panel by doctor blade technique. The coating was cured using urea as a catalyst following conventional amine catalyzed epoxy resin curing procedures.

The panel was tested for resistance using the method described for Example 1 both as prepared and after 2 weeks storage in 95 percent humidity at 95 to 100° F.

The results of a number of tests for various coating compositions are shown in Table III.

TABLE III

| Run No. | Coating Mix Ratio (Wt. Percent) | | Cure Cycle | | Coating Thickness, Inch | Resistance (Ohms) | |
|---|---|---|---|---|---|---|---|
| | Coke | Resin | Min. | °F. | | Initial | Humidity Storage |
| 1 | 50 | 50 | 5 | 350 | 0.002 | .174 | .246 |
| 2 | 60 | 40 | 5 | 350 | 0.002 | .037 | .081 |
| 3 | 70 | 30 | 5 | 350 | 0.002 | 1.65 | .690 |
| 4 | 50 | 50 | 20 | 350 | 0.002 | .187 | .226 |
| 5 | 60 | 40 | 20 | 350 | 0.002 | .041 | .072 |
| 6 | 70 | 30 | 20 | 350 | 0.002 | .337 | 1.20 |
| 7 | 60 | 40 | 15 | 375 | 0.002 | .048 | .091 |
| 8 | 60 | 40 | 10 | 400 | 0.002 | .034 | .043 |

Each of the one package bake cure or amine catalyzed epoxy resins used in the examples possessed the characteristics set forth hereinbefore as being required for operability in preparing the high conductive, liquid impervious, coated magnesium electrodes of the present invention.

In a control study a coating composition was prepared using the petroleum coke and DER 664 epoxy resin which was esterified with castor oil. Although panels coated with this mixture gave good initial conductance, after 2 weeks storage in 95 percent humidity the resistance was found to have markedly increased. Additionally, the coatings prepared using the DER 664 epoxy resin-castor oil lost adhesion because of corrosion attack of the magnesium by the coating and started to peel off the AZ61 alloy panels under the influence of the humidity. Conductances obtained with these panels are shown in Table IV.

in combination a magnesium base electrode having a tightly adherent electrically conductive coating of a cured epoxy resin-finely divided carbon composition, said electrode containing at least 70 percent by weight magnesium, said coating composition containing from about 50 to about 70 weight percent carbon and from about 50 to about 30 weight percent of said epoxy resin, said epoxy resin being a member selected from the group consisting of one-package self curing with heat and two-package amine catalyzed epoxy resins, said epoxy resins being further characterized as being free from oil, as not liberating vapor in setting and which in the cured state are solid, electrically resistant, chemically inert, have low shrinkage, are substantially free from chlorides and sulfates and are substantially unreactive with the magnesium metal of said electrode.

2. A coated metal electrode as defined in claim 1 wherein the finely divided carbon is calcined petroleum coke having a particle size of less than about 325 mesh U.S. Standard Sieve Series and the coke-epoxy resin composition contains about 60 weight percent coke and about 40 weight percent epoxy resin.

3. A coated metal electrode as defined in claim 1 wherein the electron conductive coating thickness on a given metal surface ranges from about 0.0015 inch to about .004 inch.

TABLE IV

| Run No. | Coating Mix Ratio (Wt. percent) | | Cure Cycle | | Coating Thickness, Inch | Resistance (Ohms) | | Remarks |
|---|---|---|---|---|---|---|---|---|
| | Coke | Resin | Min. | °F. | | Initial | Humidity Storage | |
| 1 | 50 | 50 | 5 | 350 | 0.002 | .540 | 7.7 | Evidence of reaction between magnesium and coating. Coating had lost adhesion and started to peel away from metal. |
| 2 | 60 | 40 | 5 | 350 | 0.002 | .620 | 6.2 | Do. |
| 3 | 50 | 50 | 20 | 350 | 0.002 | .040 | 2.6 | Do. |
| 4 | 60 | 40 | 20 | 350 | 0.002 | .160 | 3.85 | Do. |

Various modifications can be made in the present invention without departing from the spirit or scope thereof for it is understood that we limit ourselves only as defined in the appended claims.

We claim:
1. In a highly electrically conductive, liquid impervious, coated metal electrode the improvement comprising

References Cited

UNITED STATES PATENTS 2,856,342  11/1954  Van Der Hoeven et al. 204—209 X
3,012,958  12/1961  Vixler _____ 204—197
3,072,558  1/1963  Myers et al. _____ 204—280

ALLEN B. CURTIS, *Primary Examiner.*